(12) United States Patent
Kato et al.

(10) Patent No.: US 11,014,046 B2
(45) Date of Patent: May 25, 2021

(54) ACID COMPONENT REMOVAL DEVICE, ACID COMPONENT REMOVAL METHOD, AND ACID GAS REMOVAL DEVICE

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Yasuhiro Kato, Kawasaki (JP); Masatoshi Hodotsuka, Saitama (JP); Tetsuya Kaseda, Kawasaki (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 216 days.

(21) Appl. No.: 16/230,091

(22) Filed: Dec. 21, 2018

(65) Prior Publication Data
US 2019/0193025 A1 Jun. 27, 2019

(30) Foreign Application Priority Data
Dec. 26, 2017 (JP) .............................. JP2017-248992

(51) Int. Cl.
*B01D 53/96* (2006.01)
*B01D 61/44* (2006.01)
(Continued)

(52) U.S. Cl.
CPC ....... *B01D 53/965* (2013.01); *B01D 53/1425* (2013.01); *B01D 53/1475* (2013.01); *B01D 53/18* (2013.01); *B01D 53/265* (2013.01); *B01D 53/62* (2013.01); *B01D 53/78* (2013.01); *B01D 61/445* (2013.01); *B01D 61/48* (2013.01);
(Continued)

(58) Field of Classification Search
None
See application file for complete search history.

(56) References Cited

U.S. PATENT DOCUMENTS 5,200,046 A * 4/1993 Chlanda ............... B01D 61/445
204/534
5,288,385 A 2/1994 Kedem et al.
(Continued)

FOREIGN PATENT DOCUMENTS

AU 2017219159 A1 3/2018
CN 102325579 A 1/2012
(Continued)

*Primary Examiner* — Jason M Greene
(74) *Attorney, Agent, or Firm* — Oblon, McClelland, Maier & Neustadt, L.L.P.

(57) ABSTRACT

An acid component removal device for removing an acid component from an acid gas absorbent containing an amine, comprising:
an anode;
a cathode; and
an electrodialysis structure having four compartments formed by arranging an first membrane which is either an anion exchange membrane or a cation exchange membrane, a second membrane which is a bipolar membrane, and a third membrane which is either an anion exchange membrane or a cation exchange membrane and which is the other of the first membrane, in this order, from the anode end to the cathode end between the anode and the cathode, with a space each between the membranes.

4 Claims, 6 Drawing Sheets

(51) Int. Cl.
- *B01D 61/48* (2006.01)
- *B01D 53/14* (2006.01)
- *B01D 53/18* (2006.01)
- *B01D 53/78* (2006.01)
- *B01D 53/26* (2006.01)
- *B01D 53/62* (2006.01)

(52) U.S. Cl.
CPC ............. *B01D 2252/20405* (2013.01); *B01D 2252/20421* (2013.01); *B01D 2252/20484* (2013.01); *B01D 2257/504* (2013.01); *B01D 2258/0283* (2013.01); *B01D 2259/80* (2013.01); *B01D 2311/25* (2013.01); *B01D 2311/2626* (2013.01)

(56) References Cited

U.S. PATENT DOCUMENTS

| | | | |
|---|---|---|---|
| 5,401,408 A * | 3/1995 | Umemura | B01D 61/445 204/538 |
| 6,517,700 B2 | 2/2003 | Byszewski | |
| 8,506,693 B2 | 8/2013 | Nagayasu et al. | |
| 9,155,990 B2 * | 10/2015 | Graff | B01D 53/1406 |
| 2012/0235087 A1 | 9/2012 | Handagama et al. | |
| 2014/0251824 A1 * | 9/2014 | Astle | B01D 61/48 205/749 |
| 2015/0290576 A1 * | 10/2015 | Kiguchi | B01D 61/445 204/537 |
| 2016/0175778 A1 * | 6/2016 | Oikawa | B01D 61/445 73/61.53 |
| 2017/0189594 A1 * | 7/2017 | Ding | B01D 61/445 |
| 2018/0056232 A1 | 3/2018 | Kato et al. | |
| 2020/0038803 A1 * | 2/2020 | Xu | B01D 53/1425 |

FOREIGN PATENT DOCUMENTS

| | | |
|---|---|---|
| JP | 7-109591 A | 4/1995 |
| JP | 3337587 | 10/2002 |
| JP | 3392646 | 3/2003 |
| JP | 5351728 | 11/2013 |
| JP | 5704438 | 4/2015 |
| JP | 2018-34126 | 3/2018 |
| WO | WO 92/10278 A1 | 6/1992 |
| WO | WO 2010/061811 A1 | 6/2010 |
| WO | WO 2014/077373 A1 | 5/2014 |

* cited by examiner

ACID COMPONENT REMOVAL DEVICE, ACID COMPONENT REMOVAL METHOD, AND ACID GAS REMOVAL DEVICE

CROSS REFERENCE TO RELATED APPLICATIONS

This application is based upon and claims the benefit of priority from the prior Japanese Patent Application No. 2017-248992 filed on Dec. 26, 2017, the entire contents of which are incorporated herein by reference.

FIELD

Embodiments described herein relate to acid component removal devices, acid component removal methods, and acid gas removal devices.

BACKGROUND

In thermal power plants, steelmaking plants, and the like, in which a large amount of fossil fuel is consumed, combustion exhaust gases generated by combustion of fossil fuel in boilers, coal gasification gases (gasified gases) generated by gasification of coal, natural gases, and the like contain, for example, acid gases such as carbon dioxide ($CO_2$), SOx, NOx, and $H_2S$. In order to inhibit acid gases contained in such combustion exhaust gases and the like from being emitted into the air, methods of removing acid gases have been studied vigorously, in which a gas containing acid gases is subjected to gas-liquid contact with an absorbent containing an amino-group-containing compound (amine compound) in an absorber, such that the acid gases are absorbed into the absorbent, whereby the acid gases are removed from the gas to be treated.

For example, known is a carbon dioxide removal device including: an absorber in which an exhaust gas is contacted with an absorbent containing an amino-group-containing compound, such that the acid gases such as carbon dioxide in the exhaust gas are absorbed into the absorbent; and a regenerator in which the absorbent having absorbed the acid gases is heated such that the acid gases are emitted from the absorbent; in which the regenerated absorbent is supplied again into the absorber and reused, and thus the absorbent is circulated and used in the system between the absorber and the regenerator.

However, when the carbon dioxide in the gas is absorbed during the operation, not only SOx and NOx but also carbonyl sulfide, hydrogen cyanide, thiocyanic acid, thiosulfuric acid, other inorganic acids, and the like react with the amino-group-containing compound in the absorbent to produce depleted materials called heat stable amine salt (HSAS). In addition, heat stable amine salts are also produced by the amino-group-containing compound being decomposed by reaction with heat or oxygen in the gas when the absorbent is heated and regenerated. Such heat stable amine salts are accumulated in the absorbent because the salts are not decomposed with heat generated when the absorbent is regenerated in the regenerator, nor separated from the absorbent. The accumulation of such heat stable amine salts not only reduces the acid gas absorption efficiency of the absorbent but also causes the corrosion of the device, and hence it is desired to remove heat stable amine salts from the absorbent.

As a method of removing such heat stable amine salts from an absorbent, for example, an electrodialysis method using a bipolar membrane is known. However, because amines are lost when the liquid permeates through an ion exchange membrane, there is a known method in which heat stable amine salts are transferred by electrodialysis from an absorbent into a concentrated liquid and thus removed, using an electrodialyzer in which bipolar membranes and anion exchange membranes are combined to constitute a three-compartment structure including a compartment having an amine purifying function, a compartment having an amine recovery function, and a compartment having an acid recovery function in this order from the cathode end to the anode end between the opposing electrodes.

However, a device based on the above-mentioned removal technology results in having a three-compartment structure and requires a three-line flow path, hence requiring increased power to remove acids and leading to increased operation costs. In addition, there is a problem in that three kinds of liquids, an absorbent, an amine recovery liquid, and an acid recovery liquid, and three kinds of liquid-transfer pumps are used, hence causing complexity, which increases device costs.

The present invention has been made, considering such a situation, and an object of the present invention is to provide an acid component removal device and an acid component removal method which make it possible both to reduce amine loss while removing acid components of heat stable amine salts produced in an absorbent and to suppress cost increase.

Further, an object of the present invention is to provide an acid gas removal device including such an acid component removal device.

Accordingly, an acid component removal device according to an embodiment of the present invention is an acid component removal device for removing an acid component from an acid gas absorbent containing an amine, comprising:

an anode;

a cathode; and an electrodialysis structure having four compartments formed by arranging an first membrane which is either an anion exchange membrane or a cation exchange membrane, a second membrane which is a bipolar membrane, and a third membrane which is either an anion exchange membrane or a cation exchange membrane and which is the other of the first membrane, in this order, from the anode end to the cathode end between the anode and the cathode, with a space each between the membranes.

Further, an acid component removal device according to an embodiment of the present invention is an acid component removal device for removing an acid component from an acid gas absorbent containing an amine and includes: an anode; a cathode; and an electrodialysis structure having four compartments formed by arranging an anion exchange membrane, a bipolar membrane, and a cation exchange membrane in this order from the anode end to the cathode end between the anode and the cathode with a space each between the membranes.

Further, an acid component removal device according to an embodiment of the present invention is an acid component removal device for removing an acid component from an acid gas absorbent containing an amine and includes: an anode; a cathode; and an electrodialysis structure having four compartments formed by arranging a cation exchange membrane, a bipolar membrane, and an anion exchange membrane in this order from the anode end to the cathode end between the anode and the cathode with a space each between the membranes.

In addition, a method of removing an acid component according to an embodiment of the present invention is a method of removing an acid component from an acid gas absorbent containing an amine, using the above-mentioned acid component removal device according to the present invention, and includes the steps of:

(i) allowing the acid component in the acid gas absorbent to permeate through the anion exchange membrane to be removed from the acid gas absorbent;

(ii) recovering the acid component removed in the step (i) into an acid recovery liquid;

(iii) allowing the amine component in the acid recovery liquid to permeate through the cation exchange membrane to be removed from the acid recovery liquid; and (iv) recovering the amine component removed in the step (iii) into the acid gas absorbent.

In addition, an acid gas removal device according to an embodiment of the present invention has:

an absorber in which a gas to be treated containing an acid gas is contacted with an acid gas absorbent containing an amine, such that the acid gas in the gas to be treated is absorbed into the acid gas absorbent;

a regenerator in which the acid gas is removed from an acid gas absorbent having absorbed the acid gas, such that the acid gas absorbent is regenerated; and the acid component removal device according to the present invention;

in which the acid gas removal device is configured such that at least part of the acid gas absorbent regenerated in the regenerator is treated in the acid component removal device and then is reused in the acid gas removal device.

According to an embodiment of the present invention, it is possible both to reduce amine loss while removing acid components of heat stable amine salts produced in an absorbent and to suppress increase in operational and device costs.

In particular, in cases where an acid component removal device according to an embodiment of the present invention is applied to an acid gas removal device, it is also possible that amines to run off outwardly from the acid gas removal device are recovered with this acid component removal device and reused.

DETAILED DESCRIPTION

Below, embodiments of the present invention will be described in detail. Hereinafter, embodiments in which the acid gas is carbon dioxide ($CO_2$) will be described in detail, but the present invention is not limited to the cases where the acid gas is carbon dioxide ($CO_2$).

[Basic Configuration of Acid Gas Removal Device]

Devices for removing an acid gas from a gas to be treated containing the acid gas are used conventionally. As such a device for removing an acid gas, proposed is a device including: an absorber in which a gas to be treated containing an acid gas is contacted with an acid gas absorbent containing an amine, such that the acid gas is removed from the gas to be treated; and a regenerator in which the acid gas is removed from the acid gas absorbent having absorbed the acid gas, such that the acid gas absorbent is regenerated; in which the device is configured such that the acid gas absorbent regenerated in the regenerator is reused in the absorber.

Unlike such a conventional configuration, the present invention is a combination of specific acid component removal devices.

Below, a basic configuration of the acid gas removal device will be described with reference with a preferable specific example.

Figure 1:
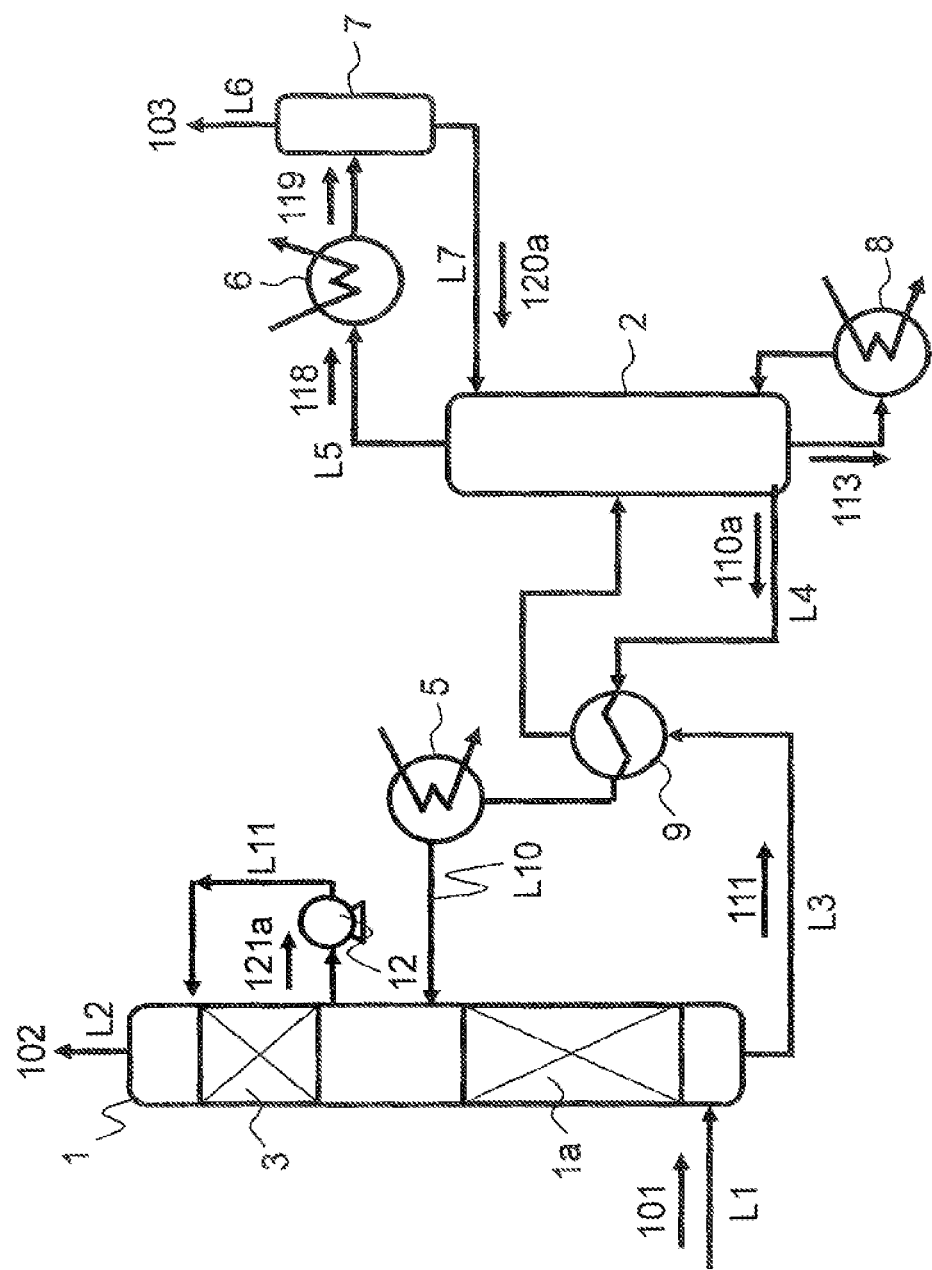
FIG. 1 is a schematic view depicting the configuration of an acid gas removal device.

FIG. 1 is a schematic view depicting a basic configuration of a preferable acid gas removal device according to an embodiment of the present invention.

As shown in FIG. 1, the acid gas removal device has an absorber 1 and a regenerator (regeneration unit) 2, and an absorbent for absorbing $CO_2$ circulates between the absorber 1 and a regenerator 2. In the absorber 1 in such an acid gas removal device, an exhaust gas (gas to be treated) 101 containing $CO_2$ is contacted with an absorbent for absorbing $CO_2$, and the absorbent absorbs $CO_2$ from the exhaust gas and then is transferred to the regenerator (regeneration unit) 2. In the regenerator 2, $CO_2$ is separated from the absorbent having absorbed $CO_2$, and the absorbent is effectively regenerated into the state of being ready to absorb $CO_2$. This regenerated absorbent is circulated from the regenerator 2 to the absorber 1 and is contacted again with the gas to be treated. This allows $CO_2$ to be efficiently removed from the gas to be treated.

More specifically, in the acid gas removal device having such a configuration, an absorbent (rich absorbent) 111 having absorbed $CO_2$ from the exhaust gas 101 is fed from the absorber 1 to the regenerator 2. In the regenerator 2, part or almost all of the $CO_2$ was removed from the rich absorbent 111, which is thus regenerated into an absorbent (lean absorbent) 110a, which is supplied from the regenerator 2 to the absorber 1.

Here, as an absorbent, an amine-based aqueous solution containing an amine compound (amino-group-containing compound) and water is preferably used. Examples of amine compounds include: primary amines such as monoethanolamine and 2-amino-2-methyl-1-propanol; secondary amines such as diethanolamine and 2-methylaminoethanol; tertiary amines such as triethanolamine and n-methyldiethanolamine; polyethylenepolyamines such as ethylenediamine, triethylenediamine, and diethylenetriamine; cyclic amines such as piperazines, piperidines, and pyrrolidines; polyamines such as xylylenediamine; and amino acids such as methylaminocarboxylic acid; and these may be used singly, or in combination of two or more kinds thereof.

The absorbent is used in the form of an aqueous solution containing these amine compounds usually at 10 to 70 wt %. In addition, the absorbent can suitably contain other compounds at any ratios to the extent that the effect of the absorbent is not impaired, examples of the compounds including: reaction promoters; nitrogen-containing-compounds for enhancing the absorption performance for an acid gas such as $CO_2$; anticorrosives for preventing the corrosion of plant facilities; defoaming agents for preventing foaming; antioxidants for preventing the degradation of an absorbent; pH adjustors; and the like.

The gas to be treated 101 is, for example, an exhaust gas containing $CO_2$, and examples of exhaust gases include: combustion exhaust gases exhausted from boilers, gas turbines, and the like in thermal power plants; process exhaust gases generated in steelmaking plants; and the like. The exhaust gas 101 is pressurized using an air blower and the like, cooled in a cooling tower, and supplied via a flue into the absorber 1 through the lower part of the absorber.

The absorber 1 can have: a $CO_2$ absorbing unit (acid gas absorbing unit) 1a in which $CO_2$ in the exhaust gas 101 is absorbed into a lean absorbent 110a; and a gas cleaning unit 3 in which the gas to be treated ($CO_2$-removed exhaust gas) from which the acid gas has been removed in the $CO_2$ absorbing unit 1a is cleaned with a cleaning liquid 121a, whereby amines are recovered from the $CO_2$-removed exhaust gas accompanied thereby.

The $CO_2$ absorbing unit 1a is formed preferably using a filler, and this enhances the gas-liquid contact efficiency. In addition, there is a liquid dispersing device provided above the $CO_2$ absorbing unit 1a, and from the device, the absorbent is dispersed and dropped toward the $CO_2$ absorbing unit 1a.

The exhaust gas 101 fed into the absorber 1 flows from the lower part to the top part (upper part) in the absorber. In the $CO_2$ absorbing unit 1a, the exhaust gas 101 ascending in the absorber comes into contact with the lean absorbent 110a and undergoes, for example, the reactions of the following formulae (1) and (2) to form a heat decomposable salt ($R_3NH_2CO_3$) and a heat stable amine salt ($R_3NHX$), and the $CO_2$ in the exhaust gas 101 is absorbed into the lean absorbent 110a and removed from the exhaust gas 101.

When descending in the absorber, the lean absorbent 110a absorbs $CO_2$ from the exhaust gas 101 to turn into a rich absorbent 111, and the rich absorbent 111 results in containing heat decomposable salts and heat stable amine salts. This rich absorbent 111 not only contains $CO_2$ but also may contain: heat stable amine salts generated by accumulation of organic acids generated by reaction with oxygen contained in the exhaust gas 101; and absorption of SOx, NOx, carbonyl sulfide, hydrogen cyanide, thiocyanic acid, thiosulfuric acid, and other inorganic acids contained in the exhaust gas 101; and the like (below, R represents hydrogen or a substituted or unsubstituted alkyl group).

$$R_3N + CO_2 + H_2O \rightarrow R_3NH_2CO_3 \quad (1)$$

$$R_3N + HX \rightarrow R_3NHX \quad (2)$$

The $CO_2$-removed exhaust gas having passed through the $CO_2$ absorbing unit 1a ascends in the absorber 1 and passes through the gas cleaning unit 3. In this gas cleaning unit 3, the $CO_2$-removed exhaust gas is cleaned with the cleaning liquid 121a, whereby amines are recovered from the $CO_2$-removed exhaust gas accompanied thereby. In this embodiment, the gas cleaning unit 3 is in the absorber 1, downstream of the $CO_2$ absorbing unit 1a in the gas flow direction of the $CO_2$-remove exhaust gas, and is provided above the $CO_2$ absorbing unit 1a.

There is a liquid dispersing device provided above the gas cleaning unit 3, and the cleaning liquid 121a supplied to the absorber 1 is dispersed and dropped toward the gas cleaning unit 3 by the liquid dispersing device. In the gas cleaning unit 3, the $CO_2$-removed exhaust gas is cleaned with the cleaning liquid 121a, whereby amines accompanying the $CO_2$-removed exhaust gas are removed from the $CO_2$-removed exhaust gas. Here, the gas cleaning unit 3 is housed in the absorber 1, but may be provided outside the absorber 1 as a gas cleaning tower separated from the absorber 1.

The cleaning liquid 121a is stored in a cleaning liquid reservoir (not shown) provided below the gas cleaning unit 3, and there is a cleaning liquid circulation line L11 linked to the clean liquid reservoir. There is a circulating pump 12 provided on the cleaning liquid circulation line L11, and the cleaning liquid 121a is transferred by the circulating pump 12 and supplied again from above the gas cleaning unit 3.

The more acidic the cleaning liquid 121a is, the higher cleaning efficiency it has, and accordingly, for example, pure water or sulfuric acid water is used. Into this cleaning liquid 121a, amines are mixed from the $CO_2$-removed exhaust gas, and when the cleaning liquid 121a is used through the cleaning liquid circulation line L11 to clean the $CO_2$-removed exhaust gas many times in the gas cleaning unit 3, the amine concentration of the cleaning liquid 121a continues to rise, whereby the amine recovery performance of the cleaning liquid 121a is usually reduced. On that account, all or part of the cleaning liquid 121a circulating through the cleaning liquid circulation line L11 is exhausted outward and supplemented with new cleaning liquid, whereby the cleaning effect of the cleaning liquid is enhanced or maintained. In some cases, the cleaning liquid with the amine recovery performance reduced may be mixed with the absorbent in the system.

The exhaust gas from which $CO_2$ has been removed in the absorber 1 is purified in the gas cleaning unit 3 and is usually exhausted outward through the top part of the absorber 1 as the treated combustion exhaust gas 102.

Meanwhile, the rich absorbent 111 having absorbed $CO_2$ in the absorber 1 is exhausted out of the lower part of the absorber 1, passes through a rich absorbent supply line L3, is pressurized by a pump (not shown) provided in the rich absorbent supply line L3, exchanges heat, in a heat exchanger 9, with the lean absorbent 110a regenerated by the regenerator 2, and then is supplied to the regenerator 2. In this heat exchanger 9, the rich absorbent 111 and the lean absorbent 110a exchange heat to heat the rich absorbent 111 and cool the lean absorbent 110a. Here, for the heat exchanger 9, a known heat exchanger such as a plate heat exchanger, a shell and tube heat exchanger, or the like can be used.

The regenerator 2 causes the rich absorbent 111 to emit $CO_2$ and thereby regenerates the rich absorbent 111 into the lean absorbent 110a that can absorb $CO_2$ efficiently. More specifically, the rich absorbent 111 is supplied into the regenerator 2 and heated with water vapor (steam) in a reboiler 8, whereby $CO_2$ is separated from the rich absorbent 111, which is thus turned into the lean absorbent 110a, i.e., the rich absorbent 111 from which part or all of the $CO_2$ is removed.

During this, the generation of water vapor is accompanied by emission of $CO_2$ which has been absorbed in the absorbent, in the form of $CO_2$ gas, from the lean absorbent 110a. The water vapor and $CO_2$ gas generated are emitted as a regenerator outlet gas 118 from the regenerator 2. The lean absorbent 110a exhausted from the regenerator 2 is pumped with a pump (not shown) for the lean absorbent 110a so as to pass through the heat exchanger 9 and then be supplied into the absorber 1.

The $CO_2$ gas separated from the lean absorbent 110a in the regenerator 2 is exhausted out of the upper part of the regenerator 2 together with the water vapor. In this way, the regenerator outlet gas 118 containing $CO_2$ gas and water vapor is cooled with cooling water in a cooler 6, and the water vapor is condensed and becomes water. A regenerator outlet gas 119 containing the condensate water and the $CO_2$ gas is supplied into a gas-liquid separator 7 and separated into $CO_2$ gas 103 and condensate water 120a, and the separated $CO_2$ gas 103 is exhausted outward. Meanwhile, the condensate water 120a is pulled out of the lower part of the gas-liquid separator 7 and returned into the upper part of the regenerator 2.

The lean absorbent 110a in the regenerator 2 is exhausted out of the lower part of the regenerator 2 through the lean absorbent exhaust line L4, cooled by heat exchange with the rich absorbent 111 in the heat exchanger 9 as above-mentioned, further cooled in a cooler 5, and then supplied into the absorber 1.

As above-mentioned, using the acid gas removal device shown in FIG. 1 makes it possible to efficiently remove $CO_2$ gas from the exhaust gas 101 containing $CO_2$ and obtain $CO_2$ gas as high purity $CO_2$ gas 103. This $CO_2$ gas 103 can be utilized for, for example, industrial raw materials, other applications, and the like, if necessary, or stored, considering a demand for the prevention of global warming.

As above-mentioned, such an acid gas removal device involves a process in which the $CO_2$ absorbent circulates between the absorber 1 and the regenerator 2 and in which the absorption of $CO_2$ and the separation of $CO_2$ are repeated, and in the process, the amine, which is a constituent of the $CO_2$ absorbent, may be lost, and the organic acids and inorganic acids generated by reaction with exhaust gas components may be accumulated in the $CO_2$ absorbent.

This tends to cause problems such as the absorption efficiency decrease of the $CO_2$ absorbent, the corrosion of the device, and the like.

Conventionally, there is a known technology in which amine loss is suppressed while heat stable amine salts are removed by electrodialysis from an absorbent into a concentrated liquid, using an electrodialyzer in which bipolar membranes and anion exchange membranes are combined to constitute a three-compartment structure including a compartment having an amine purifying function, a compartment having an amine recovery function, and a compartment having an acid recovery function in this order from the cathode end to the anode end between the opposing electrodes.

However, the above-mentioned technology involves a three-compartment structure and accordingly poses problems in that power and costs required to remove acid are increased and in that three kinds of liquids, an absorbent, an amine recovery liquid, and an acid recovery liquid, and three kinds of liquid-transfer pumps are used, hence causing complexity, which increases the device cost.

[Acid Component Removal Device]

An acid component removal device according to an embodiment of the present invention is an acid component removal device for removing an acid component from an acid gas absorbent containing an amine, comprising:

an anode;
a cathode; and
an electrodialysis structure having four compartments formed by arranging an first membrane which is either an anion exchange membrane or a cation exchange membrane, a second membrane which is a bipolar membrane, and a third membrane which is either an anion exchange membrane or a cation exchange membrane and which is the other of the first membrane, in this order, from the anode end to the cathode end between the anode and the cathode, with a space each between the membranes.

An acid component removal device according to an embodiment of the present invention can both reduce amine loss while removing acid components of heat stable amine salts produced in the absorbent and allow a further attempt at cost reduction.

Here, the acid component removal device according to the embodiment of the present invention is not to be limited to one which is applicable only to, for example, the acid gas removal device described in detail in FIG. 1 and above. The device is applicable to: an acid gas removal device other than shown in FIG. 1; the removal of acid components such as organic acids and inorganic acids present in an amine-compound-containing solution applied to such a removal device and the like and in other solutions; and the recovery of amines from heat decomposable salts and heat stable amine salts.

<First Acid Component Removal Device>

A first acid component removal device according to an embodiment of the present invention is an acid component removal device for removing an acid component from an acid gas absorbent containing an amine, and includes:

an anode, a cathode, and
an electrodialysis structure having four compartments formed by arranging an anion exchange membrane, a bipolar membrane, and a cation exchange membrane in this order from the anode end to the cathode end between the anode and the cathode with a space each between the membranes.

Such a first acid component removal device includes an electrodialysis structure having predetermined four kinds of compartments formed by arranging an anion exchange membrane, a bipolar membrane, and a cation exchange membrane between the anode and the cathode with a space each between the membranes.

Here, this first acid component removal device has the four-compartment "electrodialysis structure" as a minimum electrodialysis structure for achieving an object of the present invention and includes at least one electrodialysis structure such as this.

Accordingly, the first acid component removal device according to the embodiment of the present invention encompasses: an acid component removal device containing only one above-mentioned minimum four-compartment "electrodialysis structure" set; another containing a plurality of the minimum "electrodialysis structure" sets; and another containing this minimum "electrodialysis structure" and one or a plurality of other "electrodialysis structure" sets or another compartment(s).

Below, a preferable specific example of an acid component removal device according to the first embodiment will be described with reference to FIG. 2.

Figure 2:
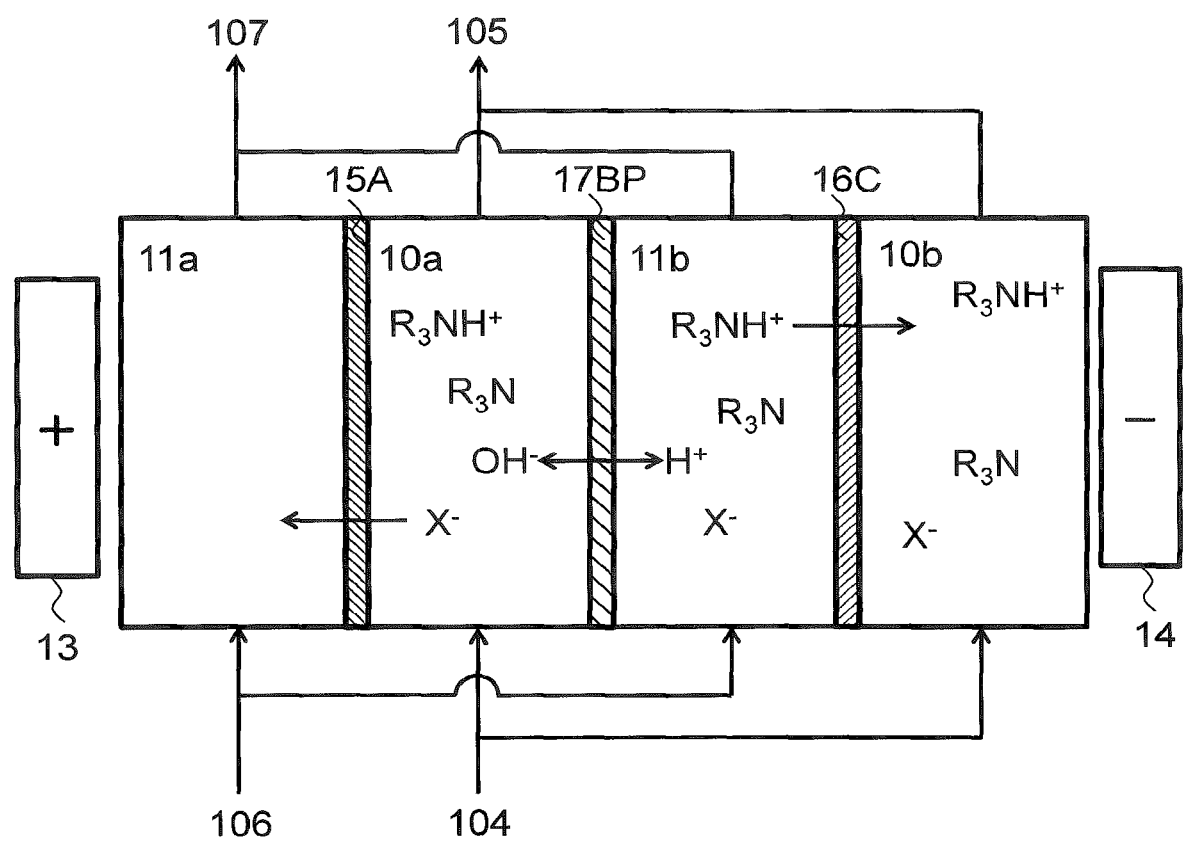
FIG. 2 is a schematic view depicting the configuration of an acid component removal device according to a first embodiment.

The acid component removal device shown in FIG. 2 is an acid component removal device including one above-mentioned predetermined "electrodialysis structure", comprising:

an anode 13, a cathode 14, and an electrodialysis structure having four compartments formed by arranging an anion exchange membrane 15A, a bipolar membrane 17BP, and a cation exchange membrane 16C in this order from the anode 13 end to the cathode 14 end between the anode 13 and the cathode 14 with a space each between the membranes.

Such an acid component removal device according to the first embodiment is an acid component removal device;

in which a first compartment formed on the anode 13 side of the anion exchange membrane 15A is an acid recovery compartment 11a for recovering the acid component removed from the acid gas absorbent;

in which a second compartment formed between the anion exchange membrane 15A and the bipolar membrane 17BP is an absorbent purification compartment 10a for removing the acid component from the acid gas absorbent;

in which a third compartment formed between the bipolar membrane 17BP and the cation exchange membrane 16C is an amine removal compartment 11b for removing the amine component from an acid recovery liquid for recovering the acid component from the acid gas absorbent; and in which a fourth compartment formed on the cathode 14 side of the cation exchange membrane 16C is an amine recovery compartment 10b for recovering the amine component removed from the acid recovery liquid, As shown in FIG. 2, the first acid component removal device 4 according to the embodiment of the present invention includes an anode 13, a cathode 14, a cation exchange membrane 16C, an anion exchange membrane 15A, and a bipolar membrane 17BP. This acid component removal device 4 is partitioned by the cation exchange membrane 16C, the anion exchange membrane 15A, and the bipolar membrane 17BP into four regions: the absorbent purification compartment 10a, the amine recovery compartment 10b, the acid recovery compartment 11a, and the amine removal compartment 11b. Between the anode 13 and the cathode 14, the anion exchange membrane 15A, the bipolar membrane 17BP, and the cation exchange membrane 16C are arranged in this order from the anode 13 to the cathode 14. The anode 13 and the cathode 14 may be immersed in an electrode liquid.

Here, in this embodiment, one each of the acid recovery compartment 11a, the absorbent purification compartment 10a, the amine removal compartment 11b, and the amine recovery compartment 10b are formed, but one or more sets of the absorbent purification compartment and the acid recovery compartment and one or more sets of the amine removal compartment and the amine recovery compartment only need to be formed, and further, a plurality of sets thereof may be formed. In addition, the number of sets of the absorbent purification compartment and the acid recovery compartment and the number of sets of the amine removal compartment and the amine recovery compartment do not have to be the same. If one or more sets of the absorbent purification compartment and the acid recovery compartment and one or more sets of the amine removal compartment and the amine recovery compartment are formed, another acid recovery compartment, another absorbent purification compartment, another amine removal compartment, and another amine recovery compartment may each be present as a single compartment.

The bipolar membrane 17BP is a composite membrane in which an anion exchange membrane and a cation exchange membrane are layered and arranged such that the anion exchange membrane is on the anode side and the cation exchange membrane is on the cathode side. When a voltage equal to or greater than the theoretical decomposition voltage of water is applied in the presence of water, the water can be electrolyzed into hydrogen ions and hydroxide ions. For a preferable bipolar membrane, a known bipolar membrane can be used such as, specifically, NEOSEPTA BP-1E (which is a tradename and made by ASTOM Corporation).

For the cation exchange membrane 16C, a high polymer membrane that has cation exchange groups and can allow the passing of cations and cut off the passing of anions is used. For the cation exchange membrane 16C, for example, a membrane composed of a high polymer having one or more of a sulfonic group, a carboxylic group, a phosphonic group, a sulfuric acid ester group, and a phosphoric acid ester group can be used. For a preferable cation exchange membrane, a known cation exchange membrane can be used, such as, specifically, NEOSEPTA CMX, NEOSEPTA CMB (which are tradenames and made by ASTOM Corporation), SELEMION CMV, SELEMION CMD, SELEMION CSO, or SELEMION CMF (which are tradenames and made by AGC Engineering Co., Ltd).

For the anion exchange membrane 15A, a high polymer membrane that has anion exchange groups and can allow the passing of anions and cut off the passing of cations is used. For the anion exchange membrane 15A, for example, a membrane composed of a high polymer having a quaternary ammonium group, which is a strongly basic group, with a weakly basic functional group such as a primary amino group, a secondary amino group, or a tertiary amino group can be used.

For a preferable anion exchange membrane, a known anion exchange membrane can be used, such as, specifically, NEOSEPTA AMX, NEOSEPTA AHA (which are tradenames and made by ASTOM Corporation), SELEMION AMV, SELEMION AMT, SELEMION DSV, SELEMION ASV, or SELEMION AHO (which are tradenames and made by AGC Engineering Co., Ltd).

The absorbent purification compartment 10a is a region between the anion exchange membrane 15A and the bipolar membrane 17BP; the anion exchange membrane 15A is arranged on the anode side of the absorbent purification compartment 10a; and the bipolar membrane 17BP is arranged on the cathode side thereof.

The acid recovery compartment 11a is positioned on the anode side of the absorbent purification compartment 10a and disposed via the anion exchange membrane 15A.

The amine removal compartment 11b is a region between the bipolar membrane 17BP and the cation exchange membrane 16C; the bipolar membrane 17BP is arranged on the anode side of the amine removal compartment 11b; and the cation exchange membrane 16C is arranged on the cathode side thereof.

The amine recovery compartment 10b is positioned on the cathode side of the amine removal compartment 11b and disposed via the cation exchange membrane 16C.

A lean absorbent to be treated 104 is supplied into each of the absorbent purification compartment 10a and the amine recovery compartment 10b, and filled into the absorbent purification compartment 10a and the amine recovery compartment 10b. In addition, an acid recovery liquid (concentrated liquid) 106 is supplied into each of the acid recovery compartment 11a and the amine removal compartment 11b, and filled into the acid recovery compartment 11a and the amine removal compartment 11b.

Specific examples of the lean absorbent 104 include the lean absorbent 110a used in the acid gas removal device shown in FIG. 1. The lean absorbent 104 may be one which is pulled out of the acid gas removal device continuously or intermittently during the operation of the removal device, or may be the absorbent which has been used in the acid gas removal device.

When a voltage is applied across both electrodes, an acid component ($X^-$) of a heat stable amine salt contained in the lean absorbent to be treated 104 inside the absorbent purification compartment 10a is attracted toward the anode 13 in the compartment because the acid component is an anion. This causes the acid component ($X^-$) of the heat stable salt in the absorbent purification compartment 10a to migrate from the absorbent purification compartment 10a to the acid recovery compartment 11a through the anion exchange membrane 15A, the acid component (X⁻) of the heat stable amine salt is removed from the lean absorbent to be treated 104, and the acid component concentration of the heat stable amine salt in the acid recovery compartment 11a rises.

Meanwhile, at the bipolar membrane 17BP, water is electrolyzed inside the membrane, hydrogen ions migrate to the cation exchange membrane side of the bipolar membrane 17BP (toward the cathode 14), and hydroxide ions migrate to the anion exchange membrane side of the bipolar membrane 17BP (toward the anode 13). Accordingly, the hydroxide ions migrate from the bipolar membrane 17BP to the absorbent purification compartment 10a, and the hydrogen ions migrate from the bipolar membrane 17BP to the amine removal compartment 11b, whereby the hydroxide ions are supplied into the absorbent purification compartment 10a, and the hydrogen ions are supplied into the amine removal compartment 11b.

The lean absorbent 105 exhausted from the absorbent purification compartment 10a may be supplied into the acid gas removal device, or may be recirculated and supplied into the absorbent purification compartment 10a to further remove the acid component from the heat stable amine salt. In addition, the liquid may be operated via a separately installed absorbent tank.

The concentrated liquid 107 exhausted from the acid recovery compartment 11a can be recirculated and supplied into the acid recovery compartment 11a again. The liquid may also be cyclically operated via a separately installed concentrated liquid tank.

In this way, the acid component removal device 4 shown in FIG. 2 allows acid components of heat stable amine salts to be removed from the lean absorbent in the absorbent purification compartment 10a, but part of the amines of the lean absorbent 104 in the absorbent purification compartment 10a also migrate to the concentrated liquid 107 through the ion exchange membrane, and the amines are accumulated in the concentrated liquid 107, resulting in amine loss.

Without being bound by theory, the following mechanism is conceivable as an example of a mechanism for reducing amine loss. It is conceivable that, for example, anions of the carbamic acid which has reacted with $CO_2$ remaining in the lean absorbent, as shown by the formula (3), pass through the anion exchange membrane 15A, resulting in causing the amine loss. (In the following formula, R represents hydrogen or a substituted or unsubstituted alkyl group.)

$$2R_2NH + CO_2 \rightarrow R_2NH_2^+ + R_2NCOO^- \quad (3)$$

Meanwhile, the concentrated liquid 107 is circulated and supplied as the concentrated liquid 106 into the amine removal compartment 11b in the acid component removal device 4, and then in the amine removal compartment 11b, the amines resulting in cations ($R_3NH^+$) (wherein R represents hydrogen or a substituted or unsubstituted alkyl group and may form a heterocycle) out of the amine components contained in the concentrated liquid 106 are attracted to the cathode 14 side. This causes the amines ($R_3NH^+$) in the amine removal compartment 11b to migrate from the amine removal compartment 11b to the amine recovery compartment 10b through the cation exchange membrane 16C, and the amines ($R_3NH^+$) are accumulated in the lean absorbent 104, whereby the amines which have migrated and lost into the concentrated liquid 107 are recovered, thus enabling the amount of loss to be reduced.

The concentrated liquid 106 only needs to have an electrical resistance that enables electrodialysis, and it is more preferable to add acid to the liquid, because the addition increases the amount of amines that have migrated to the concentrated liquid and are present in the form of cations, thus increasing the recovery amount of amines. Examples of acids that can be used include sulfuric acid, nitric acid, formic acid, acetic acid, and the like. In addition, the cyclical usage of the concentrated liquid 107 causes the acid removed from the lean absorbent 104 to be accumulated, and accordingly the amount of acid consumed can be reduced by carrying out the operation such that acid is added only in the initial stage of the operation and no acid is added thereafter.

$$R_3N + HX \rightarrow R_3NH^+ + X^- \quad (4)$$

When the acid components of the heat stable amine salts in the concentrated liquid 107 have reached a predetermined concentration, the liquid can be disposed of and a new concentrated liquid can be supplied. Alternatively, the operation can be carried out such that only part of the concentrated liquid is continuously taken out and a new concentrated liquid is continuously supplied, thereby the acid components of the stable amine salts in the concentrated liquid are maintained at a predetermined concentration.

A removal rate at which the acid components of the heat stable salts are removed from the lean absorbent 104 supplied into the absorbent purification compartment 10a is preferably 50% or less, in which the removal rate is given by the comparison between the acid components at the inlet and those at the outlet of the absorbent purification compartment 10a. A removal rate higher than this causes an imbalance with the migration amount of the amines recovered from the amine removal compartment 11b and reduces the amine recovery efficiency with respect to the amount of electrical charge. In addition, at a larger removal rate, the resistance of the part of the ion exchange membrane very near the inlet through which the lean absorbent 104 is supplied into the absorbent purification compartment 10a is different from that of the part of the ion exchange membrane very near the outlet through which the lean absorbent 104 is exhausted, whereby the whole face of the ion exchange membrane is not uniformly charged electrically, and the ion exchange membrane may be degraded.

According to the present embodiment, it is possible to reduce amine loss and suppress increase in device costs while removing acid components of heat stable amine salts produced in an absorbent.

<Second Acid Component Removal Device>

A second acid component removal device according to an embodiment of the present invention is an acid component removal device for removing an acid component from an acid gas absorbent containing an amine and includes: an anode; a cathode; and an electrodialysis structure having four compartments formed by arranging a cation exchange membrane, a bipolar membrane, and an anion exchange membrane in this order from the anode end to the cathode end between the anode and the cathode with a space each between the membranes.

Such a second acid component removal device includes an electrodialysis structure having predetermined four kinds of compartments formed by arranging a cation exchange membrane, a bipolar membrane, and an anion exchange membrane between the anode and the cathode with a space each between the membranes.

Here, this second acid component removal device has the four-compartment "electrodialysis structure" as a minimum electrodialysis structure for achieving an object of the present invention and includes at least one electrodialysis structure such as this.

Accordingly, the second acid component removal device according to the embodiment of the present invention encompasses: an acid component removal device containing only one above-mentioned minimum four-compartment "electrodialysis structure" set; another containing a plurality of the minimum "electrodialysis structure" sets; and another containing this minimum "electrodialysis structure" and one or a plurality of other "electrodialysis structure" sets, and another compartment(s).

Below, a preferable specific example of an acid component removal device according to a second embodiment will be described with reference to FIG. 3.

Figure 3:
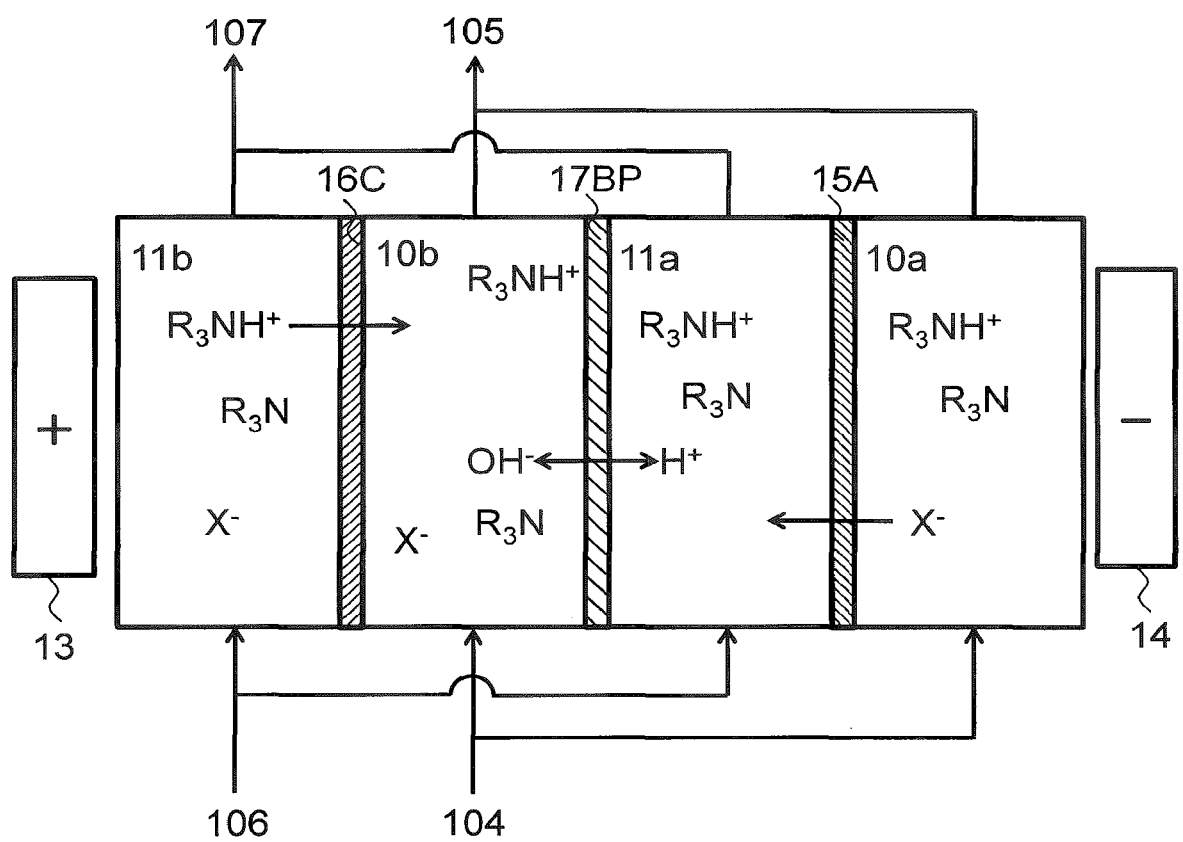
FIG. 3 is a schematic view depicting the configuration of an acid component removal device according to a second embodiment.

The acid component removal device shown in FIG. 3 is an acid component removal device including one above-mentioned predetermined "electrodialysis structure", comprising:

an anode 13, a cathode 14, and an electrodialysis structure having four compartments formed by arranging a cation exchange membrane 16C, a bipolar membrane 17BP, and an anion exchange membrane 15A in this order from the anode 13 end to the cathode 14 end between the anode 13 and the cathode 14 with a space each between the membranes.

Such an acid component removal device according to the second embodiment is an acid component removal device;

in which a first compartment formed on the anode 13 side of the cation exchange membrane 16C is an amine removal compartment 11b for removing the amine component from an acid recovery liquid for recovering the acid component from the acid gas absorbent;

in which a second compartment formed between the cation exchange membrane 16C and the bipolar membrane 17BP is an amine recovery compartment 10b for recovering the amine component removed from the acid recovery liquid;

in which a third compartment formed between the bipolar membrane 17BP and the anion exchange membrane 15A is an acid recovery compartment 11a for recovering the acid component removed from the acid gas absorbent; and in which a fourth compartment formed on the cathode 14 side of the anion exchange membrane 15A is an absorbent purification compartment 10a for removing the acid component from the acid gas absorbent.

As shown in FIG. 3, a second acid component removal device 4 according to an embodiment of the present invention includes an anode 13, a cathode 14, a cation exchange membrane 16C, an anion exchange membrane 15A, and a bipolar membrane 17BP. This acid component removal device 4 is partitioned by the cation exchange membrane 16C, the anion exchange membrane 15A, and the bipolar membrane 17BP into four regions: the absorbent purification compartment 10a, the amine recovery compartment 10b, the acid recovery compartment 11a, and the amine removal compartment 11b. Between the anode 13 and the cathode 14, the cation exchange membrane 16C, the bipolar membrane 17BP, and the anion exchange membrane 15A are arranged in this order from the anode 13 to the cathode 14. The anode 13 and the cathode 14 may be immersed in an electrode liquid.

Here, in this embodiment, one each of the acid recovery compartment 11a, the absorbent purification compartment 10a, the amine removal compartment 11b, and the amine recovery compartment 10b are formed, but one or more sets of the absorbent purification compartment and the acid recovery compartment and one or more sets of the amine removal compartment and the amine recovery compartment only need to be formed, and a plurality of sets thereof may further be formed. In addition, the number of sets of the absorbent purification compartment and the acid recovery compartment and the number of sets of the amine removal compartment and the amine recovery compartment do not have to be the same. One or more sets of the absorbent purification compartment and the acid recovery compartment and one or more sets of the amine removal compartment and the amine recovery compartment may be formed. Another acid recovery compartment, another absorbent purification compartment, another amine removal compartment, and another amine recovery compartment may each be present as a single compartment.

The bipolar membrane 17BP is a composite membrane into which an anion exchange membrane and a cation exchange membrane are layered and arranged such that the anion exchange membrane is on the anode side and the cation exchange membrane is on the cathode side. When a voltage equal to or greater than the theoretical decomposition voltage of water is applied in the presence of water, the water can be electrolyzed into hydrogen ions and hydroxide ions. A known bipolar membrane can be used, such as, specifically, NEOSEPTA BP-1E (which is a tradename and made by ASTOM Corporation).

For the cation exchange membrane 16C, a high polymer membrane that has cation exchange groups and can allow the passing of cations and cut off the passing of anions is used. For the cation exchange membrane 16C, for example, a membrane composed of a high polymer having one or more of a sulfonic group, a carboxylic group, a phosphonic group, a sulfuric acid ester group, and a phosphoric acid ester group can be used. A known cation exchange membrane can be used, such as, specifically, NEOSEPTA CMX, NEOSEPTA CMB (which are tradenames and made by ASTOM Corporation), SELEMION CMV, SELEMION CMD, SELEMION CSO, or SELEMION CMF (which are tradenames and made by AGC Engineering Co., Ltd).

For the anion exchange membrane 15A, a high polymer membrane that has anion exchange groups and can allow the passing of anions and cut off the passing of cations is used. For the anion exchange membrane 15A, for example, a membrane composed of a high polymer having a quarternary ammonium group, which is a strongly basic group, with a weakly basic functional group such as a primary amino group, a secondary amino group, or a tertiary amino group can be used.

A known anion exchange membrane can be used, such as, specifically, NEOSEPTA AMX, NEOSEPTA AHA (which are tradenames and made by ASTOM Corporation), SELEMION AMV, SELEMION AMT, SELEMION DSV, SELEMION ASV, or SELEMION AHO (which are tradenames and made by AGC Engineering Co., Ltd)

The acid recovery compartment 11a is a region between the anion exchange membrane 15A and the bipolar membrane 17BP; the bipolar membrane 17BP is arranged on the anode side of the acid recovery compartment 11a; and the anion exchange membrane 15A is arranged on the cathode side thereof.

The absorbent purification compartment 10a is positioned on the cathode side of the acid recovery compartment 11a and disposed via the anion exchange membrane 15A.

The amine recovery compartment 10b is a region between the bipolar membrane 17BP and the cation exchange membrane 16C; the cation exchange membrane 16C is arranged on the anode side of the amine recovery compartment 10b; and the bipolar membrane 17BP is arranged on the cathode side thereof.

The amine removal compartment 11b is positioned on the anode side of the amine recovery compartment 10b and disposed via the cation exchange membrane 16C.

A lean absorbent to be treated 104 is supplied into the absorbent purification compartment 10a and the amine recovery compartment 10b. In addition, an acid recovery liquid (concentrated liquid) 106 is supplied into the acid recovery compartment 11a and the amine removal compartment 11b.

As the lean absorbent 104, the lean absorbent 110a used for the acid gas removal device shown in FIG. 1 is used, and can be pulled out of the acid gas removal device continuously or intermittently or may be the absorbent which has been used in the acid gas removal device.

When a voltage is applied across both electrodes, an acid component ($X^-$) of a heat stable amine salt contained in the lean absorbent to be treated 104 is attracted toward the anode 13 in the absorbent purification compartment 10a because the acid component is an anion. This causes the acid component ($X^-$) of the heat stable salt in the absorbent purification compartment 10a to migrate from the absorbent purification compartment 10a to the acid recovery compartment 11a through the anion exchange membrane 15A, the acid component ($X^-$) of the heat stable amine salt is removed from the lean absorbent to be treated 104, and the acid component from the heat stable amine salt is accumulated in the concentrated liquid 106.

Meanwhile, at the bipolar membrane 17BP, water is electrolyzed inside the membrane, hydrogen ions migrate to the cation exchange membrane side of the bipolar membrane 17BP (toward the cathode 14), and hydroxide ions migrate to the anion exchange membrane side of the bipolar membrane 17BP (toward the anode 13). Accordingly, the hydroxide ions migrate from the bipolar membrane 17BP to the amine recovery compartment 10b, and the hydrogen ions migrate from the bipolar membrane 17BP to the acid recovery compartment 11a, whereby the hydroxide ions are supplied into the lean absorbent 104, and the hydrogen ions are supplied into the concentrated liquid 106.

The lean absorbent 105 exhausted from the absorbent purification compartment 10a may be supplied into the acid gas removal device, or may be recirculated and supplied into the absorbent purification compartment 10a to further remove the acid component from the heat stable amine salt. In addition, the liquid may be operated via a separately installed absorbent tank.

The concentrated liquid 107 exhausted from the acid recovery compartment 11a is recirculated and supplied into the acid recovery compartment 11a again. The liquid may also be cyclically operated via a separately installed concentrated liquid tank.

In this way, acid components of heat stable amine salts are removed from the lean absorbent, but part of the amines of the lean absorbent 104 in the absorbent purification compartment 10a migrate to the concentrated liquid 107 through the ion exchange membrane, and the amines are accumulated in the concentrated liquid 107, resulting in amine loss.

The concentrated liquid 107 is circulated and supplied as the concentrated liquid 106 into the acid component removal device 4, and then in the amine removal compartment 11b, the amines resulting in cations ($R_3NH^+$) (wherein R represents hydrogen or a substituted or unsubstituted alkyl group and may form a heterocycle) out of the amine components contained in the concentrated liquid 106 are attracted to the cathode 14 side.

This causes the amines ($R_3NH^+$) in the amine removal compartment 11b to migrate from the amine removal compartment 11b to the amine recovery compartment 10b through the cation exchange membrane 16C, and the amines ($R_3NH^+$) are accumulated in the lean absorbent 104, whereby the amines which have migrated and lost into the concentrated liquid are recovered, thus enabling the amount of loss to be reduced.

When the acid components of the heat stable amine salts in the concentrated liquid have reached a predetermined concentration, the liquid can be disposed of and a new concentrated liquid can be supplied. Alternatively, the operation can be carried out such that only part of the concentrated liquid is continuously taken out and a new concentrated liquid is continuously supplied, thereby the acid components of the stable amine salts in the concentrated liquid are maintained at a predetermined concentration.

A removal rate at which the acid components of the heat stable salts are removed from the lean absorbent 104 supplied into the absorbent purification compartment 10a is preferably 50% or less, in which the removal rate is given by the comparison between the acid components at the inlet and those at the outlet of the absorbent purification compartment 10a. A removal rate higher than this causes an imbalance with the migration amount of the amines recovered from the amine removal compartment 11b and reduces the amine recovery efficiency with respect to the amount of electrical charge. In addition, at a larger removal rate, the resistance of the part of the ion exchange membrane very near the inlet through which the lean absorbent 104 is supplied into the absorbent purification compartment 10a is different from that of the part of the ion exchange membrane very near the outlet through which the lean absorbent 104 is exhausted, whereby the whole face of the ion exchange membrane is not uniformly charged electrically, and the ion exchange membrane may be degraded.

According to the present embodiment, it is possible to reduce amine loss and suppress increase in device costs while removing acid components of heat stable amine salts produced in an absorbent.

<Third Acid Component Removal Device>

A third acid component removal device according to an embodiment of the present invention includes both the "electrodialysis structure" detailed in the <First Acid Component Removal Device> and the "electrodialysis structure" detailed in the <Second Acid Component Removal Device>.

Below, a preferable specific example of an acid component removal device according to the third embodiment will be described with reference to FIG. 4.

Figure 4:
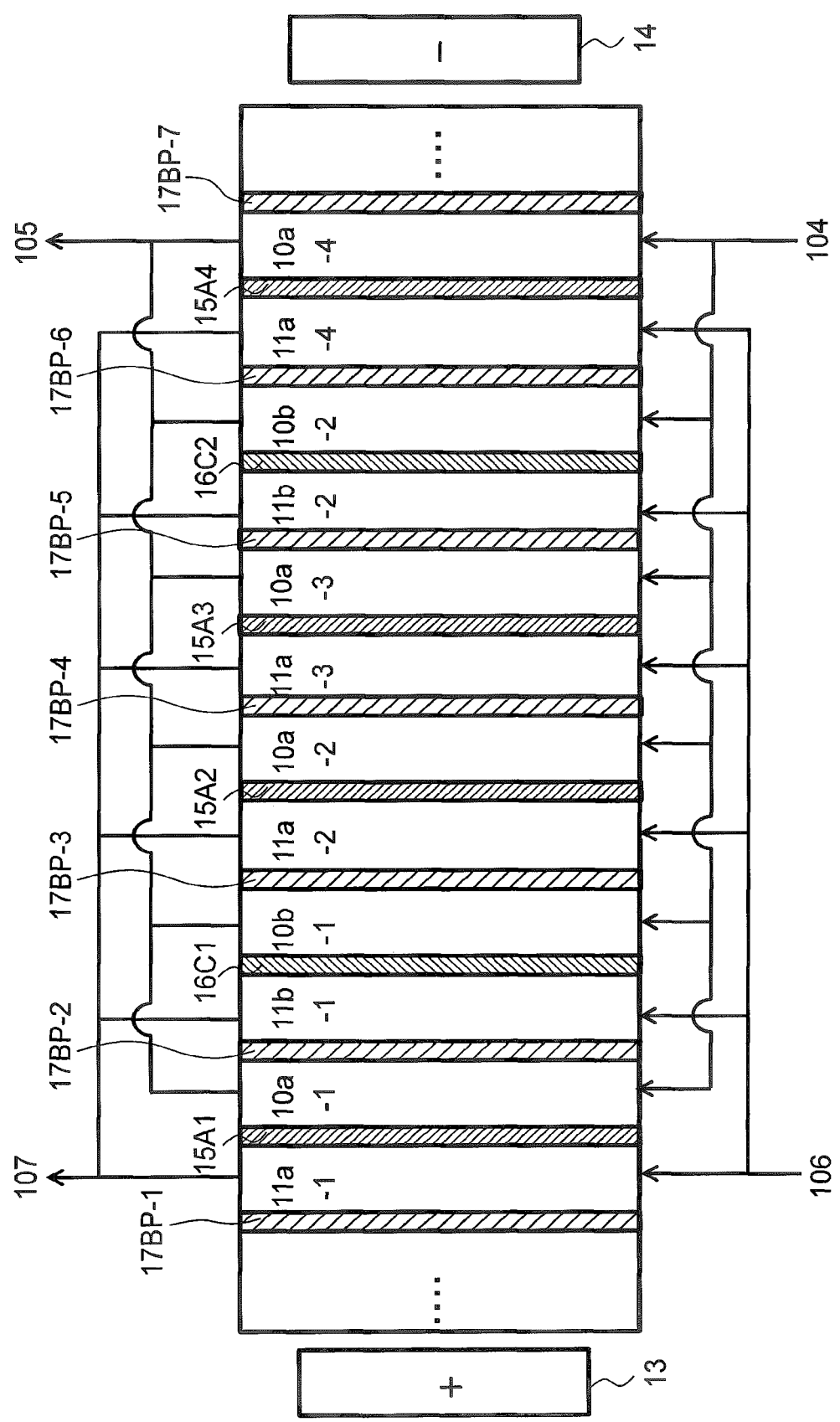
FIG. 4 is a schematic view depicting the configuration of an acid component removal device according to a third embodiment.

The third acid component removal device shown in FIG. 4 includes both: the "electrodialysis structure" of the first acid component removal device, i.e., an "electrodialysis structure" having four compartments (i.e., (11a-1), (10a-1), (11b-1), and (10b-1)) formed by arranging an anion exchange membrane (15A1), a bipolar membrane (17BP-2), and a cation exchange membrane (16C1) in this order from the anode 13 with a space each between the membranes; and the "electrodialysis structure" of the second acid component removal device, i.e., an "electrodialysis structure" having four compartments (i.e., (11b-2), (10b-2), (11a-4), and (10a-4)) formed by arranging a cation exchange membrane (16C2), a bipolar membrane (17BP-6), and an anion exchange membrane (15A4) in this order toward the cathode 14 with a space each between the membranes.

Here, the third acid component removal device encompasses an acid component removal device formed of not only the above-mentioned two kinds of "electrodialysis structures" but also one or more other compartments.

Examples of such other compartments include an acid recovery compartment (11*a*-2), an absorbent purification compartment (10*a*-2), an acid recovery compartment (11*a*-3), and an absorbent purification compartment (10*a*-3), which are shown in FIG. 4.

In the third acid component removal device shown in FIG. 4, a bipolar membrane 17BP-1 is arranged on the anode side of the acid recovery compartment 11*a*-1, a bipolar membrane 17BP-3 is arranged on the cathode side of the amine recovery compartment 10*b*-1, a plurality of acid recovery compartments and absorbent purification compartments are further disposed on the cathode side of the amine recovery compartment 10*b*-1, and an amine removal compartment and an amine recovery compartment are further disposed.

In this way, forming a plurality of absorbent purification compartments and acid recovery compartments and a plurality of amine removal compartments and amine recovery compartments increases the removal amount of acid component of the heat stable salt from the lean absorbent. In addition, it is preferable to have more sets of the absorbent purification compartment and the acid recovery compartment than sets of the amine removal compartment and the amine recovery compartment. Because acid components of heat stable salts are removed in the amine removal compartments and the amine recovery compartments, having more sets of the amine removal compartment and the amine recovery compartment will lead to having an increased number of compartments in order to remove a predetermined amount of acid components of heat stable salts, and thus the device will result in a larger one.

In addition, in cases where a large number of compartments are disposed, the arrangement of the sets of the amine removal compartment and the amine recovery compartment can be set in any way relative to the sets of the absorbent purification compartment and the acid recovery compartment, but, in order to have uniform resistance in the device, it is preferable to dispose the sets such that the sets of the amine removal compartment and the amine recovery compartment are equally spaced in the device, instead of separating the arrangement into the position where the sets of the absorbent purification compartment and the acid recovery compartment are put together and the position where the sets of the amine removal compartment and the amine recovery compartment are put together.

In addition to the sets of the absorbent purification compartment and the acid recovery compartment or the sets of the amine removal compartment and the amine recovery compartment, another acid recovery compartment, another absorbent purification compartment, another amine removal compartment, and another amine recovery compartment may each be present as a single compartment.

According to the present embodiment, it is possible to reduce amine loss and suppress increase in device costs while efficiently removing acid components of heat stable amine salts produced in an absorbent.

[Method of Removing Acid Component]

An method of removing an acid component according to an embodiment of the present invention is a method of removing an acid component from an acid gas absorbent containing an amine, using the above-mentioned acid component removal device, and includes the steps of:

(i) allowing the acid component in the acid gas absorbent to permeate through the anion exchange membrane to be removed from the acid gas absorbent;

(ii) recovering the acid component removed in the step (i) into an acid recovery liquid;

(iii) allowing an amine component in the acid recovery liquid to permeate through the cation exchange membrane to be removed from the acid recovery liquid; and (iv) recovering the amine component removed in the step (iii) into the acid gas absorbent.

Such a method of removing acid components can be easily carried out, preferably using the acid component removal devices according to the above-mentioned <first embodiment> to <third embodiment> and in accordance with the below-mentioned detailed description.

[Acid Gas Removal Device]

Below, a preferable specific example of an acid gas removal device according to an embodiment of the present invention will be described with reference to FIG. 5 and FIG. 6.

Figure 5:
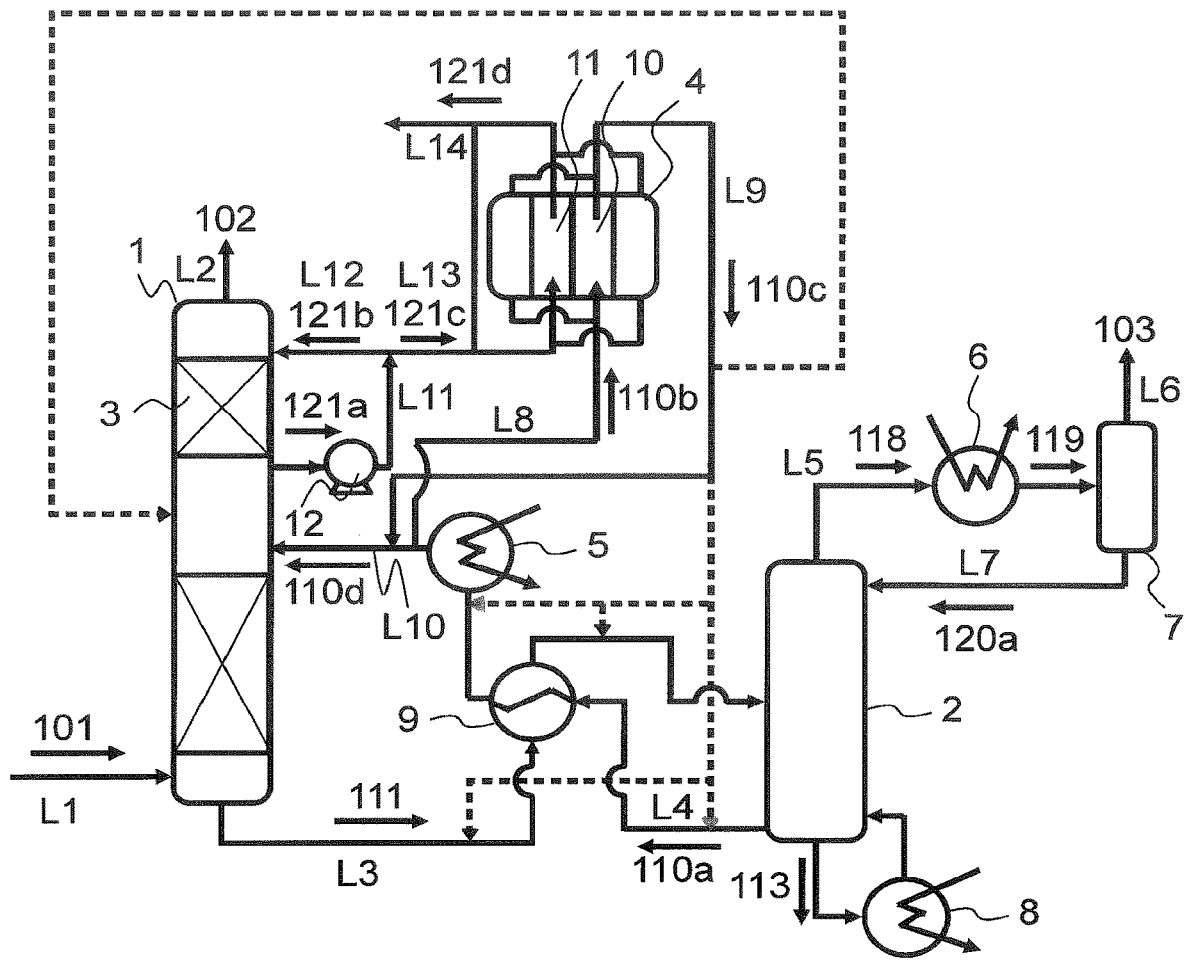
FIG. 5 is a schematic view depicting the configuration of an acid gas removal device to which an acid component removal device according to an embodiment is applied.
Figure 6:
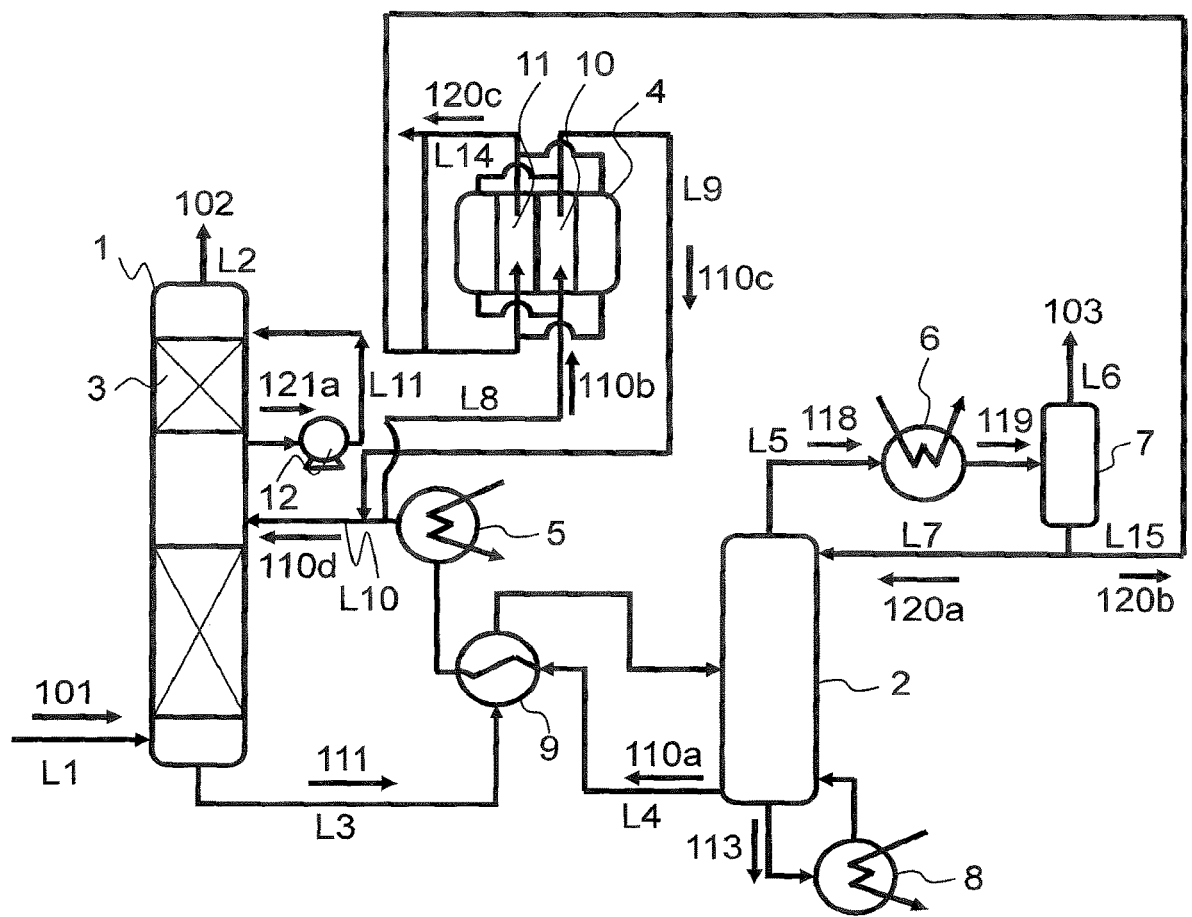
FIG. 6 is a schematic view depicting the configuration of an acid gas removal device to which an acid component removal device according to an embodiment is applied.

As shown in FIG. 5 and FIG. 6, the acid gas removal device according to an embodiment of the present invention has:

an absorber 1 in which a gas to be treated 101 containing an acid gas is contacted with an acid gas absorbent 110*a* containing an amine, such that the acid gas in the gas to be treated is absorbed into the acid gas absorbent; a regenerator 2 in which the acid gas is removed from the acid gas absorbent having absorbed the acid gas, such that the acid gas absorbent is regenerated; and the acid component removal device 4 according to the embodiment of the present invention;

in which the acid gas removal device is configured such that at least part 110*b* of the acid gas absorbent regenerated in the regenerator 2 is treated in the acid component removal device 4 and then is reused in the absorber 1.

Here, any of the first to third acid component removal devices can be used as the acid component removal device.

<First Acid Gas Removal Device>

A first acid gas removal device specifically shown in FIG. 5 further includes:

a gas cleaning unit 3 for cleaning gas exhausted from an absorber 1, and a flow path L13 for supplying the acid component removal device 4 with at least part 121*c* of a cleaning liquid 121*a* obtained from the gas cleaning unit 3.

The first embodiment has the acid gas removal device shown in FIG. 1 and the acid component removal device 4 shown in any of FIGS. 2 to 4.

An absorbent withdrawal line L8 is provided which branches off from a lean solution exhaust line L4 and which is linked to the acid component removal device 4, and part of the lean solution 110*a* to be supplied to the absorber 1 is supplied as a lean absorbent to be treated 110*b* into the absorbent purification compartment and amine recovery compartment 10 of the acid component removal device 4. In addition, a purified absorbent supply line L9 is provided which links the acid component removal device 4 to the lean solution exhaust line L4, and a purified lean solution 110*c* exhausted from the absorbent purification compartment and amine recovery compartment 10 of the acid component removal device 4 is supplied into the lean solution exhaust line L4 through the purified absorbent supply line L9. Here, in the FIG. 5, the position where the liquid withdrawal line L8 branches off from the lean solution exhaust line L4 is preferably between a cooler 5 and the absorber 1 but may be upstream of the cooler 5 in the flow direction of the absorbent.

On a cleaning liquid circulation line L11, a cleaning liquid withdrawal line L13 is provided which branches off from the cleaning liquid circulation line L11 and which is linked to the acid component removal device 4, and part of a cleaning liquid 121a to be supplied into the absorber 1 is supplied as a cleaning liquid 121c into the acid recovery compartment and amine removal compartment 11 of the acid component removal device 4.

The behavior in the acid component removal device 4 will be described with reference to FIG. 5 and FIG. 2. The cleaning liquid 121c (106 in FIG. 2) contains amines from the $CO_2$-removal exhaust gas.

The cleaning liquid 121c is supplied as an acid recovery liquid (concentrated liquid) into an acid recovery compartment 11a and the amine removal compartment 11b. In the amine removal compartment 11b, the amines resulting in cations out of the amine components contained in the cleaning liquid 121c migrate from the amine removal compartment 11b to the amine recovery compartment 10b through the cation exchange membrane 16C, and the amines are recovered in the lean absorbent 110b (104 in FIG. 2).

In the first to third acid component removal devices, amines that have migrated from the lean absorbent to the concentrated liquid in the acid recovery process are recovered, and accordingly the effect of reducing the loss is high in the case where the concentrated liquid is circulated for use, while, in the case where the cleaning liquid 121c is used, the amine recovery effect is higher because the cleaning liquid 121c contains amines accumulated through the gas cleaning.

Acid may be added to the cleaning liquid 121c before the liquid is supplied to the acid component removal device 4. The addition increases the amount of amines that have migrated to the concentrated liquid and are present in the form of cations, thus increasing the recovery amount of amines.

In addition, the acid components of the heat stable salts are accumulated in the cleaning liquid 121c that has passed through the acid component removal device 4, and the amines contained in the liquid are reduced, whereby the cleaning liquid recovers the performance as a cleaning liquid to be used in the gas cleaning unit 3 and hence can be used again in the gas cleaning unit 3.

The purified absorbent supply line L9 in FIG. 5 is downstream of the absorbent withdrawal line L8 but may be at another position and, for example, may be connected to the rich absorbent exhaust line L3 coming out of the absorber 1.

In addition, the lean solution 110b may be once supplied into an absorbent tank and then supplied from the absorbent tank to the acid component removal device 4, instead of being supplied directly into the acid component removal device 4.

The purified lean solution 110c exhausted from the absorbent purification compartment and amine recovery compartment 10 of the acid component removal device 4 can be supplied to the acid component removal device 4 again and allow acid components of heat stable salts to be further removed therefrom.

A cleaning liquid exhaust line which links the acid component removal device 4 to the cleaning liquid circulation line L11 may be provided to supply the cleaning liquid circulation line L11 with the cleaning liquid 121d exhausted from the acid component removal device 4.

The concentrated liquid to be supplied to the acid recovery compartment and amine removal compartment 11 of the acid component removal device 4 may be mixed with not only the cleaning liquid 121c but also separately supplied pure water and the like.

The cleaning liquid 121c may be once supplied into a concentrated liquid tank and then supplied from the concentrated liquid tank to the acid component removal device 4, instead of being supplied directly into the acid component removal device 4.

With a conventional acid gas recovery device in which such an acid component removal device 4 as shown in FIG. 1 is not provided, amines are accumulated in the cleaning liquid 121a, and reduction in the cleaning efficiency of the cleaning liquid cannot be avoided, whereas, with the acid gas removal device according to the present embodiment shown in FIG. 5, the accumulation of amines in the cleaning liquid 121a is inhibited as above-mentioned, and reduction in the cleaning efficiency can be prevented. Further, the recovery of amines of the cleaning liquid 121a into the acid gas absorbent is possible, and the amines can be effectively utilized to remove acid gas, whereas the recovery cannot be achieved with a conventional acid gas removal device. Accordingly, with an acid gas removal device according to the present embodiment, it is possible to further reduce amine loss and also reduce the amount used of concentrated liquid while efficiently removing acid components of heat stable amine salts produced in an absorbent.

Second Embodiment

A second acid gas removal device specifically shown in FIG. 6 further includes
a condensation unit 7 for obtaining a condensate liquid by cooling the gas exhausted from the regenerator 2 and
has a flow path L15 for supplying the acid component removal device 4 with at least part 120b of the condensate liquid obtained from the gas condensation unit 7.

The second embodiment has the acid gas removal device shown in FIG. 1 and the acid component removal device 4 shown in any of FIGS. 2 to 4.

According to this second embodiment, condensate water 120b which is part of condensate water 120a separated in the gas-liquid separator 7 of the regenerator 2 is supplied into the acid recovery compartment and amine removal compartment 11 of the acid component removal device 4.

On a condensate water supply line L7, a condensate water withdrawal line L15 is provided which branches off from the condensate water supply line L7 and which is linked to the acid component removal device 4, and part of the condensate water 120a supplied into the regenerator 2 is supplied as the condensate water 120b into the acid recovery compartment and amine removal compartment 11 of the acid component removal device 4.

The behavior in the acid component removal device 4 will be described with reference to FIG. 6 and FIG. 2. The condensate water 120b (106 in FIG. 2) contains amines from a regenerator outlet gas 118.

The condensate water 120b is supplied into the acid recovery compartment 11a and the amine removal compartment 11b. In the amine removal compartment 11b, the amines resulting in cations out of the amine components contained in the condensate water 120b migrate from the amine removal compartment 11b to the amine recovery compartment 10b through the cation exchange membrane 16C, and the amines are recovered in the lean absorbent 110b (104 in FIG. 2). The amines which have migrated and lost into the concentrated liquid are recovered, thus enabling the amount of loss to be reduced.

In the embodiments of the first to third acid component removal devices, amines migrate from the lean absorbent to the concentrated liquid and are recovered in the acid recovery process, and accordingly the effect of reducing the loss is high in cases where the concentrated liquid is circulated for use, while, in cases where the condensate water 120b is used, the amine recovery effect is even higher because the condensate water 120b contains amines diffused from the regenerator 2.

Because the condensate water 120b contains a large amount of $CO_2$, the amount of amines resulting in cations ($R_3NH^+$) is large, and the condensate water is preferable for recovering amines, and further, acid may be added to the condensate water 120b before the water is supplied to the acid component removal device 4. The addition increases the amount of amines that have migrated to the concentrated liquid and is present in the form of cations, thus increasing the recovery amount of amines.

In addition, because acid components of heat stable salts are accumulated in the condensate water 120b, and the amines contained in the water is reduced, the condensate water may be used as a cleaning liquid in the gas cleaning unit 3.

In addition, the gas-liquid separator 7 according to the present embodiment may be a cleaning tower with a filler disposed therein in order to enhance the effect of cleaning off impurities from the $CO_2$ gas 103.

According to the present embodiment, it is possible to further reduce amine loss and also reduce the amount used of concentrated liquid while efficiently removing acid components of heat stable amine salts produced in an absorbent.

As above, the acid component removal devices, acid component removal methods, and acid gas removal devices according to some embodiments of the present invention have been described, but these embodiments are presented as examples and are not to limit the scope of the invention. These embodiments can be carried out in various other forms, and various omissions, substitutions, modifications, or additions can be made to the invention without departing from the spirit and scope of the invention. These embodiments and variations thereof are included in the spirit and scope of the invention and included in the scope of the inventions recited in CLAIMS and the equivalents of the inventions.

EXAMPLES

Example 1

Sulfuric acid and formic acid were added to a 30 mass % monoethanolamine aqueous solution so as to be 5 g/L and 5 g/L respectively; $CO_2$ gas was blown into the resulting mixture such that the amount of $CO_2$ absorbed is 0.3 mol/L; and a mimic absorbent thus prepared was used in an amount of 1 L as an absorbent. As a concentrated liquid, 400 ml of 0.1 mol/L sulfuric acid aqueous solution was used, and as an electrode liquid, 400 ml of 3% sulfuric acid aqueous solution was used.

NEOSEPTA BP-1E (made by ASTOM Corporation) was used as a bipolar membrane, NEOSEPTA AHA (made by ASTOM Corporation) was used as an anion exchange membrane, and NEOSEPTA CMB (made by ASTOM Corporation) was used as a cation exchange membrane.

A DW-Lab electrodialyzer (AGC Engineering Co., Ltd.) was used, which had a membrane configuration: Anode Compartment-BP-A-BP-A-BP-A-BP-C-BP-Cathode Compartment (BP: bipolar membrane, A: anion exchange membrane, C: cation exchange membrane), was formed of three acid recovery compartments, three absorbent purification compartments, one amine removal compartment, and one amine recovery compartment, and had an effective membrane area of 30 cm² (5×6 cm) per membrane.

Using a pump, the mimic absorbent was supplied to the absorbent purification compartment and the amine recovery compartment, the concentrated liquid was supplied to the acid recovery compartment and the amine removal compartment, and the electrode liquid was supplied to the anode compartment and the cathode compartment such that the line speed to the membrane surfaces was 6 cm/second; a voltage of 9 V was applied; and the acid components were removed for six hours. The acid removal rates and amine loss amounts obtained in the six hours are shown in Table 1. The acid removal rate was evaluated as a ratio of the amount of acid removed in the six hours to the amount of acid previously contained in the absorbent. The amine loss amount was evaluated as the amount (mol) of amines lost when 1 eq of acid was removed.

Example 2

The acid components were removed in the same manner as in Example 1 except that the membrane configuration was Anode Compartment-BP-A-BP-A-BP-C-BP-C-BP-Cathode Compartment and that two acid recovery compartments, two absorbent purification compartments, two amine removal compartments, and two amine recovery compartments were formed.

Example 3

The acid components were removed in the same manner as in Example 1 except that, to obtain a concentrated liquid, monoethanolamine was added to a 0.1 mol/L sulfuric acid aqueous solution so as to be 0.5 mass %.

Comparative Example 1

The acid components were removed in the same manner as in Example 1 except that the membrane configuration was Anode Compartment-BP-A-BP-A-BP-A-BP-A-BP-Cathode Compartment and that four acid recovery compartments and four absorbent purification compartments were formed.

TABLE 1

|  | Acid Removal Rate (%) | Amine Loss Amount (mol-amine/eq · acid) |
| --- | --- | --- |
| Example 1 | 63 | 0.17 |
| Example 2 | 47 | 0.15 |
| Example 3 | 59 | 0.15 |
| Comparative Example 1 | 75 | 0.20 |

In Comparative Example 1, the amine loss amount (the amount of amines lost to remove 1 eq of acid) was large, whereas the amine loss amount was much reduced in Example 1 and Example 2. However, the acid removal rate was reduced as the ratio of the amine recovery compartments was increased, and it is preferable to have more absorbent purification compartments than amine recovery compartments.

In addition, as shown in Example 3, the concentrated liquid containing amines from the beginning allowed the amine loss to be reduced and also afforded the effect of recovering amines from the concentrated liquid.

As above-mentioned, according to the present invention, it is possible to reduce amine loss while removing acid components of heat stable amine salts produced in an absorbent.

REFERENCE SIGNS LIST

1: absorber
2: regenerator
3: gas cleaning unit
4: acid component removal device
7: condensation unit
13: anode
14: cathode
15A: cation exchange membrane
16: anion exchange membrane
17BP: bipolar membrane
11a: acid recovery compartment
10a: absorbent purification compartment
11b: amine removal compartment
10b: amine recovery compartment

The invention claimed is:

1. A method of removing an acid component from an acid gas absorbent containing an amine, using an acid component removal device for removing an acid component from an acid gas absorbent containing an amine, comprising:
an anode;
a cathode; and
an electrodialysis structure having four compartments formed by arranging a first membrane which is either an anion exchange membrane or a cation exchange membrane, a second membrane which is a bipolar membrane, and a third membrane which is either an anion exchange membrane or a cation exchange membrane and which is the other of the first membrane, in this order, from the anode end to the cathode end between the anode and the cathode, with a space each between the membranes;
wherein the first membrane is the anion exchange membrane, and the third membrane is the cation exchange membrane;
wherein a first compartment formed on the anode side of the first membrane is an acid recovery compartment for recovering the acid component removed from the acid gas absorbent;
wherein a second compartment formed between the first membrane and the second membrane is an absorbent purification compartment for removing the acid component from the acid gas absorbent;
wherein a third compartment formed between the second membrane and the third membrane is an amine removal compartment for removing the amine component from an acid recovery liquid for recovering the acid component from the acid gas absorbent; and
wherein a fourth compartment formed on the cathode side of the third membrane is an amine recovery compartment for recovering the amine component removed from the acid recovery liquid,
the method comprising the steps of:
(i) allowing the acid component in the acid gas absorbent to permeate through the anion exchange membrane to be removed from the acid gas absorbent;
(ii) recovering the acid component removed in the step (i) into the acid recovery liquid;
(iii) allowing the amine component in the acid recovery liquid to permeate through the cation exchange membrane to be removed from the acid recovery liquid; and
(iv) recovering the amine component removed in the step (iii) into the acid gas absorbent.

2. An acid gas removal device comprising:
an absorber in which a gas to be treated containing an acid gas is contacted with an acid gas absorbent containing an amine, such that the acid gas in the gas to be treated is absorbed into the acid gas absorbent;
a regenerator in which the acid gas is removed from an acid gas absorbent having absorbed the acid gas, such that the acid gas absorbent is regenerated; and
an acid component removal device for removing an acid component from an acid gas absorbent containing an amine, comprising:
an anode;
a cathode; and
an electrodialysis structure having four compartments formed by arranging a first membrane which is either an anion exchange membrane or a cation exchange membrane, a second membrane which is a bipolar membrane, and a third membrane which is either an anion exchange membrane or a cation exchange membrane and which is the other of the first membrane, in this order, from the anode end to the cathode end between the anode and the cathode, with a space each between the membranes;
wherein the first membrane is the anion exchange membrane, and the third membrane is the cation exchange membrane;
wherein a first compartment formed on the anode side of the first membrane is an acid recovery compartment for recovering the acid component removed from the acid gas absorbent;
wherein a second compartment formed between the first membrane and the second membrane is an absorbent purification compartment for removing the acid component from the acid gas absorbent;
wherein a third compartment formed between the second membrane and the third membrane is an amine removal compartment for removing the amine component from an acid recovery liquid for recovering the acid component from the acid gas absorbent; and
wherein a fourth compartment formed on the cathode side of the third membrane is an amine recovery compartment for recovering the amine component removed from the acid recovery liquid,
wherein the acid gas removal device is configured such that at least part of the acid gas absorbent regenerated in the regenerator is treated in the acid component removal device and then is reused in the acid gas removal device.

3. The acid gas removal device according to claim 2, further comprising:
a gas cleaning unit for cleaning gas exhausted from the absorber, and
a flow path for supplying the acid component removal device with at least part of a cleaning liquid obtained from the gas cleaning unit.

4. The acid gas removal device according to claim 2, further comprising:
a condensation unit for obtaining a condensate liquid by cooling the gas exhausted from the regenerator, and
a flow path for supplying the acid component removal device with at least part of the condensate liquid obtained from the condensation unit.

* * * * *